United States Patent
Pozdeev-Freeman

(10) Patent No.: US 6,447,570 B1
(45) Date of Patent: Sep. 10, 2002

(54) SINTERED TANTALUM AND NIOBIUM CAPACITOR PELLETS DOPED WITH NITROGEN, AND METHOD OF MAKING THE SAME

(75) Inventor: Yuri L. Pozdeev-Freeman, Kennebunk, ME (US)

(73) Assignee: Vishay Sprague, Inc., Sanford, ME (US)

( * ) Notice: Subject to any disclaimer, the term of this patent is extended or adjusted under 35 U.S.C. 154(b) by 0 days.

(21) Appl. No.: 09/726,866

(22) Filed: Nov. 30, 2000

(51) Int. Cl.⁷ .............................. C22C 1/06; C22C 27/02
(52) U.S. Cl. .............................. 75/245; 419/29; 419/31
(58) Field of Search ..................... 419/29, 31; 75/245

(56) References Cited

U.S. PATENT DOCUMENTS

| | | | | |
|---|---|---|---|---|
| 4,059,442 A | * | 11/1977 | Bernard | |
| 4,537,641 A | * | 8/1985 | Albrecht et al. | |
| 4,722,756 A | | 2/1988 | Hard | |
| 5,448,447 A | * | 9/1995 | Chang | 361/529 |
| 5,456,878 A | * | 10/1995 | Tadokoro et al. | 419/38 |
| 5,825,611 A | | 10/1998 | Pozdeev | |
| 6,010,660 A | * | 1/2000 | Pozdeev | 419/29 |
| 6,051,044 A | * | 4/2000 | Fife | 75/229 |
| 6,136,062 A | * | 10/2000 | Loffelholz et al. | 75/369 |

FOREIGN PATENT DOCUMENTS

EP    0 984 469 A2    8/2000

* cited by examiner

*Primary Examiner*—Ngoclan Mai
(74) *Attorney, Agent, or Firm*—McKee, Voorhees & Sease, P.L.C.

(57) ABSTRACT

A pellet for use in electrolytic capacitors is comprised of a powder selected from one of Tantalum and Niobium. The pellet is porous, free from oxygen, annealed by heat, and diffused with nitrogen with all these attributes being achieved in an oxygen free environment. The method of producing the pellet involves the steps of taking a powder selected from one of Tantalum and Niobium pressing the powder into a self-contained pellet; removing any oxygen in the pellet; annealing the pellet; and subjecting the pellet to nitrogen gas so that the nitrogen diffuses into the pellet to reduce DLC, with all these steps taking place in an oxygen free environment.

32 Claims, 4 Drawing Sheets

SINTERED TANTALUM AND NIOBIUM CAPACITOR PELLETS DOPED WITH NITROGEN, AND METHOD OF MAKING THE SAME

FIELD OF THE INVENTION

The present invention relates to Tantalum and Niobium pellets used in the manufacture of Tantalum and Niobium capacitors. In particular, the invention is an improved method of sintering, deoxidization and doping with Nitrogen of Tantalum and Niobium pellets. Hereafter, the expression "Tantalum (Niobium)" will mean "Tantalum or Niobium".

BACKGROUND OF THE INVENTION

This invention relates to an improved method of making Tantalum and Niobium pellets, and more particularly to the production of such pellets for use in electrolytic capacitors.

The usual method for making Tantalum (Niobium) pellets for use in Tantalum and Niobium capacitors includes steps wherein Tantalum (Niobium) powder is first pressed or compacted into pellets. The resulting pressed pellets then undergo a sintering process wherein the pellets are heated in a vacuum. The heating allows the Tantalum (Niobium) particles to stick together providing mechanical strength and electrical conductivity to the pellet.

The Tantalum (Niobium) lead "wires" can be embedded into the pellets during the pressing process. During sintering, the Tantalum (Niobium) particles stick to the lead wire providing strong lead to pellet attachment. Such pellets are herein referred to as "embedded type pellets". The Tantalum (Niobium) pellets can be also pressed without lead wires. In that case, the pressed pellets undergo an initial sintering followed by lead wire to pellet welding. Such pellets are referred to here as "welded type pellets". To purify the welding zone, the welded pellets undergo a second sintering process wherein the pellets with welded lead wire are heated in vacuum. This heating removes contamination from the welding zone by either evaporation of the impurities or redistribution of the impurities through out the pellet.

Following the sintering process, the Tantalum (Niobium) pellets are electrically anodized in an acid solution to form a dielectric film on the outer surface of the metal particles which is typically Tantalum (Niobium) Pentoxide. The pellet is subsequently coated with either various metal-containing materials (typically manganese dioxide) or conductive polymers, which form the cathode layer of the capacitor.

For electrolytic capacitors, oxygen concentration in the sintered Tantalum (Niobium) pellets is critical, especially when this concentration approaches the solubility limit of oxygen in the metal. Oxide phase precipitates on the surface of the Tantalum (Niobium)pellets act as efficient crystallization nuclei in the amorphous Tantalum (Niobium) Pentoxide film formed by anodization. The growth of these nuclei in the amorphous matrix of the Tantalum (Niobium) oxide films results in disruptions in the film, which cause degradation and failure in the electrolytic capacitors. The degradation rate is higher in Niobium capacitors than in Tantalum capacitors because the amorphous Pentoxide of Niobium is more susceptible to crystallization than the amorphous Pentoxide of Tantalum.

Besides crystallization, high oxygen concentrations in sintered pellets cause embrittlement of the lead wire in the vicinity of the sintered pellet. This is due to oxygen diffusion from the pellet into the lead wire; mostly into its crystalline grain boundaries. The brittle lead wire can be cracked or broken at assembly affecting capacitor yields and reliability.

Tantalum (Niobium) powders have a great affinity for oxygen and they may be significantly contaminated with oxygen during sintering. The major source for oxygen is the natural oxide film that always exists on the surface of Tantalum (Niobium) pellets when they are exposed to air. During heating in vacuum the oxygen from the surface oxide dissolves in the bulk of the Tantalum (Niobium) particles resulting in an increased concentration of oxygen in the sintered pellets.

Contamination with oxygen is a major barrier to the usage of high CV powders for Tantalum (Niobium) capacitors. This is also the major reason for the reduction of rated voltages in high CV capacitors. The higher the rated voltage, the thicker is the amorphous Tantalum (Niobium) Pentoxide film and therefore the film is more susceptible to crystallization.

A prior art method for reducing of oxygen concentration in sintered Tantalum (Niobium) pellets comprises the addition of oxygen active metals (preferably magnesium) to the sintered pellets and heating at temperatures above the melting point of the oxygen active metal and below the temperatures conventionally used for sintering the Tantalum (Niobium) pellets. During heating, atoms of the oxygen active metal react with oxygen in the Tantalum (Niobium) forming metal oxide molecules that evaporate out of the pellets. This reduces the oxygen concentration in the Tantalum (Niobium) pellets.

The above deoxidizing process has been used for welded type pellets after their initial sintering. Due to this process, the oxygen concentration in the initially sintered Tantalum (Niobium) pellets returns to the low level inherent in the Tantalum (Niobium) powder prior to sintering. However, with subsequent sintering the oxygen concentration in the Tantalum (Niobium) pellets increases again. This is due to dissolving of the natural oxide that forms on the Tantalum (Niobium) surface when pellets are exposed to air following the deoxidization process. The higher powder CV (surface area), the greater the oxygen concentration in the finally sintered pellets.

The above deoxidizing process is not used for embedded type pellets because it results in detachment of the lead wire from the pellet. The pull out strength for the lead wire drops from 2–4 kg after sintering to 0.1–0.2 kg after deoxidization. The electrical resistance of the lead to pellet junction increases sharply which makes impossible the anodizing of such pellets. As deoxidizing can't be used, sintered embedded type pellets, especially very high CV pellets, are characterized by high oxygen concentration.

Another prior art method for reducing the oxygen concentration in Tantalum (Niobium) pellets involves Nitrogen doping of sintered pellets by means of heating in a nitrogen containing atmosphere, (preferably Nitrogen gas) so that diffusion of nitrogen into the Tantalum (Niobium) particles occurs. Nitrogen doping prevents diffusion of oxygen from the ambient atmosphere and from the anodic oxide film into the Tantalum (Niobium) particles resulting in stabilization of the amorphous structure and chemical composition of the dielectric film. As a consequence, Tantalum (Niobium) capacitors made from such pellets have low and stable direct current leakage (DCL) and high reliability.

Nitrogen doping of Tantalum (Niobium) pellets requires a low oxygen concentration in the sintered pellets. Both impurities (Nitrogen and Oxygen) occupy the same positions in the crystalline lattice of Tantalum (Niobium). When these positions have been occupied by oxygen, diffusion of Nitrogen into the Ta (Nb) becomes virtually impossible. For this reason, sintered Tantalum (Niobium) pellets with high oxygen content can't be properly doped with Nitrogen.

It is therefore a principal object of this invention to conduct a process for producing capacitor pellets continuously within an oxygen free environment.

It is a further object of the present invention to provide a method of reducing the oxygen content of sintered Tantalum (Niobium) pellets.

It is a further object of the present invention to provide a method of making flexible lead wires with strong attachment to the sintered pellet.

It is a further object of the present invention to provide a method of doping of sintered Tantalum (Niobium) pellets with Nitrogen It is yet a further object of the present invention to provide low and stable (DCL), high CV, an extended range of rated voltages, and high reliability of the Tantalum (Niobium) electrolytic capacitors produced from Tantalum (Niobium) pellets sintered according to this invention.

These and other objects will be apparent to those skilled in the art.

SUMMARY OF THE INVENTION

This invention provides a process by which sintered Tantalum (Niobium) pellets are produced having low oxygen content, flexible lead wires with strong attachment to the pellets, and are doped with nitrogen. Before application of this process, Tantalum (Niobium) powder is pressed into the pellets with embedded lead wires or without lead wires. In the last case, the pressed pellets undergo an initial sintering in vacuum and lead wire to pellet welding. The new process includes three steps running one after another and without exposure of the pellets to an oxygen-containing environment. The first step is deoxidizing of the Tantalum (Niobium) pellet by an oxygen active metal (preferably magnesium) previously added to the pellets. The second step is annealing of the pellets in either inert gas or vacuum in the temperature range from that conventionally used for deoxidizing to that conventionally used for sintering. This process step provides either sintering of the embedded pellets or purification of the welding zone in welded pellets. The third step is doping of the sintered pellets with nitrogen by heating in a nitrogen-containing atmosphere (preferably nitrogen gas) at temperatures lower than the annealing temperature. Usage of Tantalum (Niobium) pellets processed continuously within an oxygen free environment according to this invention allows one to produce Tantalum and Niobium capacitors with high CV, an extended range of rated voltages, low and stable DCL, and high reliability.

DETAILED DESCRIPTION OF THE PREFERRED EMBODIMENT

The present invention generally relates to Tantalum and Niobium electrolytic capacitors that are used in many types of electronic devices. The more popular usages for Tantalum and Niobium capacitors are in personal computers, disk drives, cellular phones, printers, automotive electronics and military equipment.

Figure 5:
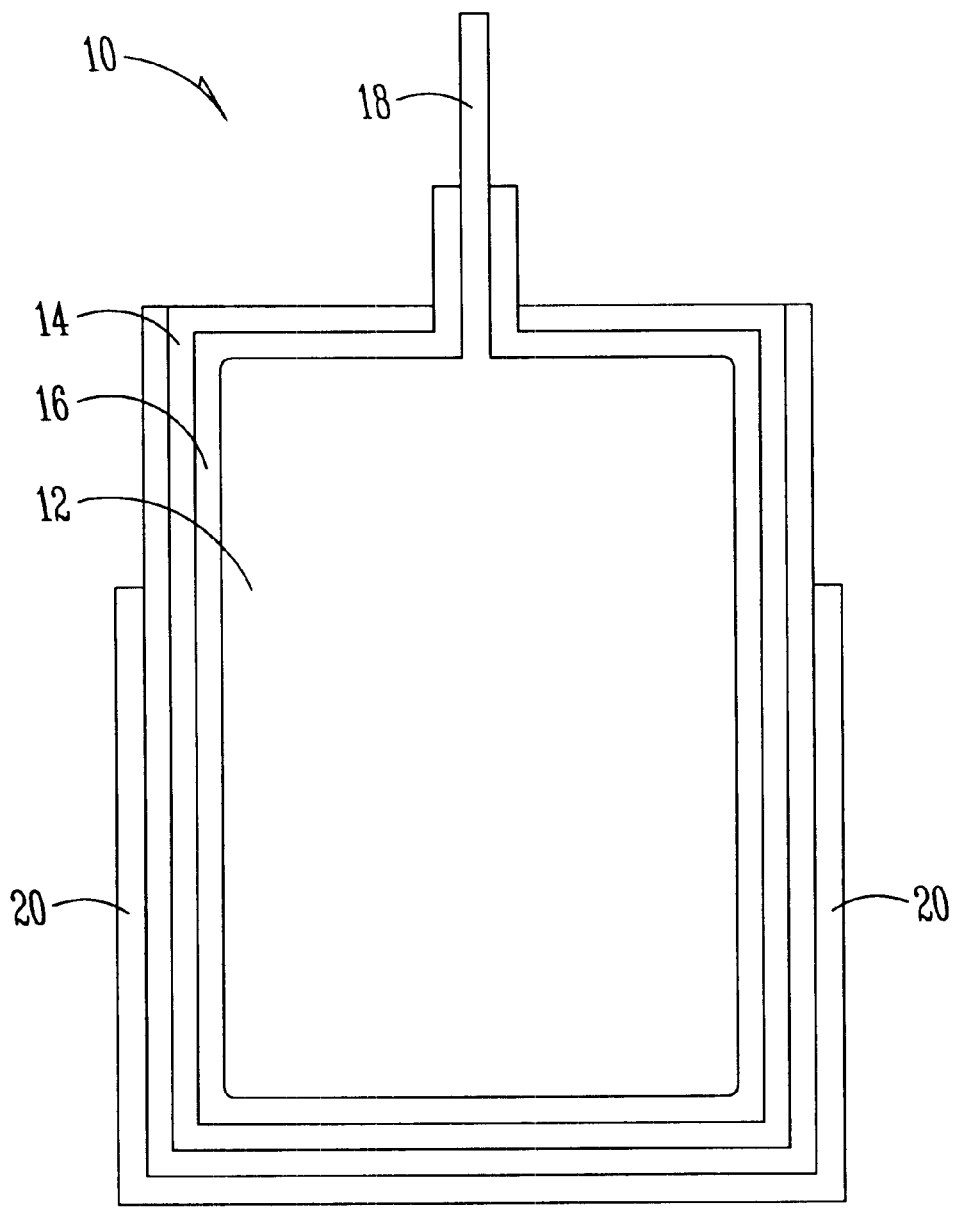
FIG. 5 is a finished capacitor including the pellet of FIG. 3.

In the Tantalum (Niobium) capacitors 10 (FIG. 5), the two conductors are the porous Tantalum (Niobium) pellet 12 and the Manganese Dioxide or conductive polymer layer 14. The dielectric layer 16 is a Tantalum (Niobium) Pentoxide film formed by anodizing the Tantalum (Niobium) pellets 12. When the capacitor 10 is in use, the Tantalum (Niobium) is positively charged and acts as the anode, the Manganese Dioxide or conductive polymer 14 is negatively charged and acts as the cathode. The capacitor 10 also includes a Tantalum (Niobium) anode lead wire 18 or 18A as a positive termination, and layers 20 of carbon and silver on the outer surface of the cathode serve as a negative termination.

Figure 3:
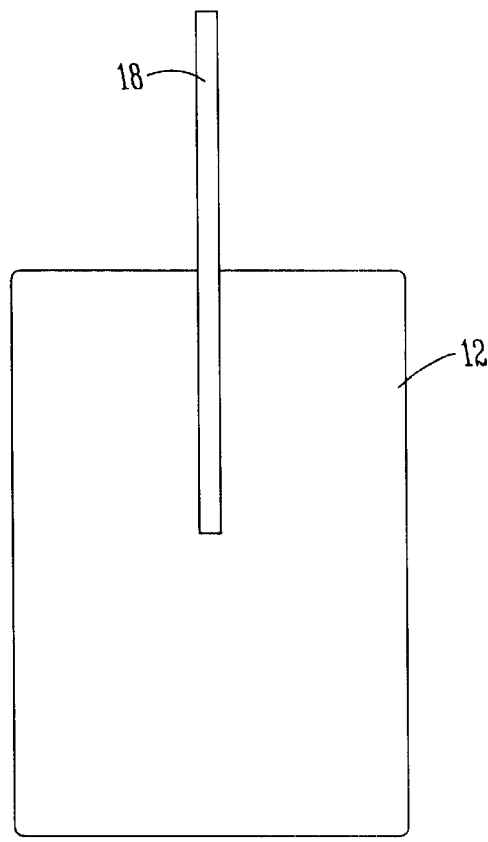
FIG. 3 is a cross-sectional view of a pellet with a lead element embedded therein.
Figure 4:
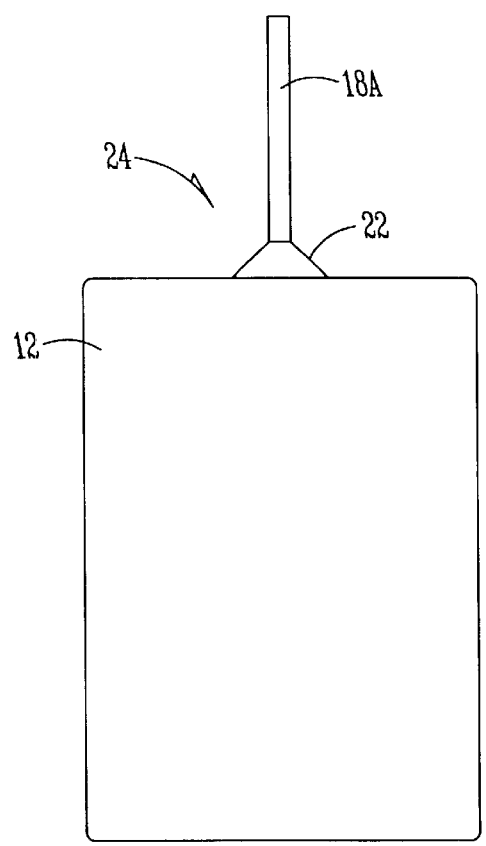
FIG. 4 is a cross-sectional view of a pellet with a lead element welded therein.

In the process of the present invention, Tantalum (Niobium) metal powder is first compressed into the porous pellets 12. A lead wire 18 from the same material as the powder is embedded into the pellet (FIG. 3) during pressing, or the pellets may be also pressed without a lead wire. In the second case the pressed pellets 12 are initially sintered in vacuum and then the lead wire 18A is welded to the pellets 12 by weldment 22 in welding zone 24 (FIG. 4). The weldment 22 is a melted portion of wire 18 created when current is passed through the wire 18. All of these conventional methods are well known in the art. The choice between embedded and welded type pellets depends on the pellet size and shape as well as on the production rate. Embedded pellets are preferable for small sizes and low production rates, while welded ones are preferable for larger sizes and higher production rates.

Oxygen active metal (preferably magnesium) is mixed with the pressed pellets with embedded lead wires or with the initially sintered pellets with welded lead wires. The concentration of magnesium is 2–8 percent by weight for Tantalum and 4–16 percent by weight for Niobium. The preferable concentration is 4–6 percent by weight for the Tantalum and 8–10 percent by weight for the Niobium. Magnesium may be added as powder or as flakes to the Tantalum (Niobium) pellets.

Crucibles with Tantalum (Niobium) pellets and magnesium are then placed into a vacuum chamber and the air is pumped out of the chamber, all at room temperature. After that the chamber is filled with inert gas and the temperature is increased to 700 C–1200 C (preferably 800 C–1000 C). As the bonding energy for magnesium—oxygen couple is higher than that for Tantalum—Oxygen (Niobium—Oxygen), the magnesium reacts with oxygen in the Tantalum (Niobium) powder particles. Magnesium Oxide molecules are formed which evaporate out of the pellets. The process takes 1–10 hours (preferably 2–4 hours) to remove virtually all oxygen from the surface and from the bulk of the Tantalum (Niobium) particles.

After the deoxidization is complete, the pellets are annealed either in an inert atmosphere or in vacuum at a temperature between those conventionally used for deoxidization and those conventionally used for sintering (1200 C–1800 C). The preferable annealing temperature is 50 C–150 C lower than that conventionally used for sintering of the Tantalum (Niobium) pellets. This process step provides sintering of the embedded type pellets and purification of the welding zone in the welded type pellets. As oxygen is an inhibitor of the sintering process, its removal in the previous deoxidizing step provides effective sintering of the powder particles to each other and particles to the lead wire at temperatures lower than conventionally used for sintering. From that, lead to pellet attachment in the final pellets is high (A pull out test generally results in a broken lead wire and not in pulling of the lead wire out of the pellet). The lead wire is flexible because of low oxygen content and smaller crystalline grain size.

In welded pellets, annealing provides effective purification of the welding zone. The purification of the welding zone includes evaporation of residual metals from the fixtures used in the welding procedure as well as redistribution of the any Niobium peak around the welding zone in the Tantalum pellets. A small amount of Niobium is always present in Tantalum as a substitution solid solution. As Niobium atoms are lighter than Tantalum atoms, they diffuse out of the welding zone under the influence of high current pulses and high temperature gradient during welding. The Niobium concentrates at the periphery of the welding zone where the temperature drops down sharply, making impossible further diffusion of the Niobium atoms. During the annealing step this Niobium concentration is uniformly redistributed in the Tantalum pellet. When pellets are free of oxygen, the diffusion activity of impurities gets higher allowing effective purification of the welding zone at temperatures lower than generally used for second sintering.

The final step is doping of the Tantalum (Niobium) pellets with nitrogen. Nitrogen gas is admitted to the chamber with pellets during their cooling following the previous annealing step. As the pellets are free of oxygen, the nitrogen easily diffuses into the Tantalum (Niobium) particles in the temperature range between the annealing temperature and down to approximately 300 C, when diffusion of nitrogen in Tantalum (Niobium) becomes very slow. The preferred temperature ranges for nitriding are 1000–1200 C and 400–700 C. The temperature range 700–1000 is less acceptable for nitriding because a TaN phase is formed that affects subsequent anodizing process on the pellets. An optimal nitrogen concentration in the sintered Tantalum (Niobium) pellets gives the minimum DCL and maximum reliability to the finished capacitors.

Embedded wire and welded wire pellets sintered according to this invention are characterized by low oxygen content, flexible lead wires with strong attachment to the pellet, and are doped with nitrogen. The embedded pellets don't require additional sintering because this was accomplished by the annealing step of the present invention. The welded pellets don't require second sintering because its effect has been achieved at annealing step of the present invention.

Usage of the Tantalum pellets sintered according to this invention allows the production of Tantalum capacitors with unique properties that can't be achieved using the conventional sintering process. This includes highest CV Tantalum capacitors, increased rated voltages for high CV capacitors, low DCL and high reliability for the Tantalum capacitors including in the high temperature range.

Usage of Niobium pellets sintered according to this invention allows the production of high CV Niobium capacitors with both polymer and $MnO_2$ cathodes. In the last case the Niobium capacitors have performance and reliability equal to that of conventional Tantalum capacitors with $MnO_2$ cathodes. Deposition of the $MnO_2$ requires high temperature processing, while the polymer cathode is deposited near the room temperature. The Niobium Pentoxide on pellets sintered according to this invention withstands the thermal stress during the high temperature processing required to apply the $MnO_2$. Conventional processes result in high DCL, low yield and unsatisfactory Life test characteristics of the final Niobium capacitors. That is why high CV Niobium capacitors with conventional $MnO_2$ cathodes can be manufactured only according to this invention.

The following examples are set forth for illustrative purpose only and are not intended to limit the present invention in any manner.

EXAMPLE 1

Welded-type Tantalum pellets were pressed from Tantalum powder with CV=70,000 uFV/g with out lead wires and sintered in a vacuum at a temperature of approximately 1300 C by the conventional method. A Tantalum lead wire was welded to the each pellet after its initial sintering by passing a current through the lead wire and pellet. The weight of Tantalum powder in each pellet being known; 6% by weight of magnesium was added to the initially sintered Tantalum pellets with welded lead wires. After that, the pellet lot was split into experimental and control parts. The control pellets passed deoxidization in a special furnace and then second sintering in a vacuum chamber at a temperature of approximately 1300 C by conventional methods.

Then, according to this invention, crucibles with the experimental Tantalum pellets containing magnesium were placed into a vacuum chamber and the air was pumped out to a pressure of $1\times10-6$ Torr. This step was conducted at room temperature. After that, Argon was admitted into the chamber and the temperature was increased from room temperature to about of 1,000 C for 2.5 hours. During this process step, magnesium atoms reacted with oxygen in the Tantalum powder particles, forming Magnesium Oxide molecules that evaporated out of the pellets. This process provided deoxidization of the Tantalum powder/pellets.

After that, the temperature in the vacuum chamber was increased to 1150 C and pellets were annealed at this temperature for 10 minutes. The annealing provides purification of the welding zone, including evaporation of the residual metals from welding fixtures and redistribution of the Niobium concentrated around the welding zone.

The effect of the annealing is different for the embedded type and welded type pellets. For the embedded pellets, annealing provides sintering (sticking together) of the powder particles and particles to the lead wire. Due to the sintering, the final pellets have high mechanical strength and low electrical resistance. The conventional sintering process is performed in the temperature range 1200 C–1800 C depending on the powder CV. The higher CV (smaller powder particles), the lower is the sintering temperature. This correlation (small particles—low sintering temperature) prevents from the over shrinkage of the pellets resulting in the capacitance losses. In the present invention the annealing of the embedded pellets works the same way as conventional sintering, providing high mechanical strength and low resistance to the final pellet. However, the annealing temperature is 50 C–150 C lower than that conventionally used for the sintering of the powder with given CV. This is due to removal of the oxygen (sintering inhibitor) from the pellets on the previous Deoxidization step.

The welded type pellets should be initially sintered without the lead wire prior to running of the invented process. The initial sintering provides mechanical strength to the pellet that allows welding of the lead wire to the pellet. After the welding is completed, the invented process starts. It includes the same process steps (Deoxidization, Annealing and Nitriding) as in the case of the embedded pellets.

However, in this case the major function of the annealing is to purify the welding zone from the impurities accumulated during the welding process. This is similar to the second sintering, that is conventionally performed for the welded type pellets after the lead to pellet welding.

After annealing, the temperature was reduced to 450 C and pure nitrogen gas was admitted to the chamber for 5 min at a flow rate of approximately 1000 cc/min. Then the nitrogen gas was removed from the chamber and the Tantalum pellets were cooled down to room temperature in inert gas. Air was then admitted to the chamber gradually to prevent any temperature increase due to rapid thermal oxidation of the sintered pellets.

When nitrogen is injected into the chamber with the hot pellets it is absorbed by the pellet surface (Tantalum and Niobium possess strong "gettering" properties at high temperature). From the surface nitrogen atoms diffuses into the bulk of the Tantalum (Niobium) particles under the influence of the concentration gradient. When doped with nitrogen, Tantalum and Niobium pellets lose activity for absorption of oxygen either from the ambient atmosphere or from the anodic oxide film after its formation. The "passivation" due to doping with nitrogen provides stabilization of the interface between anode and anodic oxide film that results in low DCL, high DCL stability and high reliability of the final capacitors. The nitriding in the temperature ranges 1000 C–1200 C and 400 C–700 C gives the best results in terms of DCL. Doping with nitrogen in the temperature range 700 C–1000 C doesn't improve DCL and sometimes even results in the DCL increase. It may be caused by forming of the TaN phase on the pellet surface, that doesn't allow proper anodizing process.

Table 1. shows the chemical composition of the sintered powder, pull out strength and hardness of the lead wire, and Wet check results for both the experimental and control pellets.

TABLE 1

| Pellet Parameters | Experimental | Control |
|---|---|---|
| Oxygen, ppm | 3200 | 5400 |
| Nitrogen, ppm | 2400 | 230 |
| Lead Pull out Test, kg | 2.9 | 2.7 |
| Lead Hardness, kg/mm2 | 180 | 470 |
| Wet Check at 50 V: | | |
| Capacitance, uFV/g | 52 k | 48.9 k |
| DCL, nAuFV | 0.16 | 0.21 |
| Rejects from 10 pieces | 1 | 2 |
| Result | Passed | Passed |
| Wet Check at 70 V: | | |
| Capacitance, uFV/g | 43.1 k | 41.65 k |
| DCL, nA/uFV | 0.315 | 0.58 |
| Rejects from 10 pieces | 1 | 6 |
| Result | Passed | Failed |

Table 1 shows that the experimental pellets are characterized by low oxygen and are doped with nitrogen, their lead wire has strong attachment to the pellet and are flexible (low hardness). The experimental pellets passed both 50 V and 70 V Wet Check, while control pellets passed 50 V and failed 70 V Wet Check.

EXAMPLE 2

Embedded type Niobium pellets were pressed from Niobium powder with CV=96,000 uFV/g. Niobium lead wires were embedded into the pellets during the pressing. The weight of Niobium powder in each pellet is known. After pressing, the pellet lot was split into experimental pellets and control pellets. The central pellets were sintered in a vacuum at 1150 C by a conventional method.

Ten percent by weight of magnesium had been mixed with the experimental Niobium pellets with embedded lead wires. The crucibles with the experimental Niobium pellets containing magnesium were placed into a vacuum chamber and the chamber was pumped down to a pressure of 1×10 Torr. After that, Argon was admitted into the chamber and the temperature was increased from room temperature to about of 960 C for 1 hour. As shown in the example 1, this process step provided deoxidization of the Niobium powder/pellets.

After that, the temperature in the vacuum chamber was increased to 1050 C and the pellets were annealed at this temperature for 10 minutes. The annealing provided sintering of the Niobium powder particles to each other and to the lead wire.

After the annealing, the temperature was reduced to 350 C and pure nitrogen gas was admitted into the chamber for 3 min at a flow rate about of 100 cc/min. Then the nitrogen was removed from the chamber and the Niobium pellets were cooled in an inert atmosphere to room temperature. The air was admitted to the vacuum chamber gradually to prevent a temperature increase due to sharp thermal oxidation.

Table 2 shows the chemical composition of the sintered Niobium pellets; pull out strength and hardness of the lead wire; and Wet check results for the experimental and control pellets.

TABLE 2

| Pellet Parameters | Experimental | Control |
|---|---|---|
| Oxygen, ppm | 4200 | 19300 |
| Nitrogen, ppm | 940 | 220 |
| Lead Pull out Test, kg | 4.2 | 3.9 |
| Lead Hardness, kg/mm2 | 130 | 430 |
| Wet Check at 30 V: | | |
| Capacitance, uFV/g | 94.9 | 93.3 |
| DCL, nA/uFV | 0.95 | 1.32 |
| Rejects from 10 pieces | 0 | 1 |
| Result | Passed | Passed |

Table 2 shows that the experimental pellets are characterized by low oxygen and are doped with nitrogen. Their lead wire has strong attachment to the pellet and are flexible (low hardness). Both experimental and control pellets passed Wet Check at 30 V and were used for manufacturing of the Niobium capacitors rating 150 uF/6 V. The final parts were subjected to standard Life test at 85 V and rated voltage Table 3 shows yield and 2000 hours Life test results for the Niobium capacitors with experimental and control pellets:

TABLE 3

| Capacitor Parameters | Experimental | Control |
|---|---|---|
| Yield, % | 82.3 | 74.5 |
| LT Failures from 96 pc. | 0 | 7 |
| Result | Passed | Failed |

Figure 1:
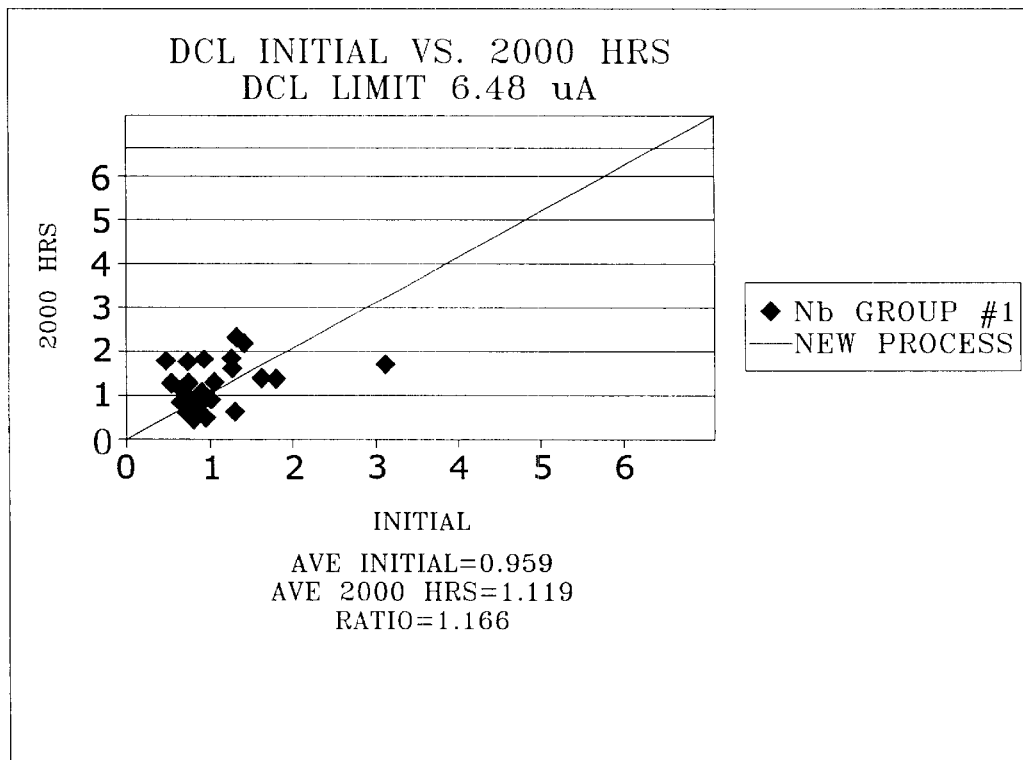
FIGS. 1 and 2 are graphs showing DCL distribution before and after, respectively, a 2000 h Life test for experimental and control pellets.
Figure 2:
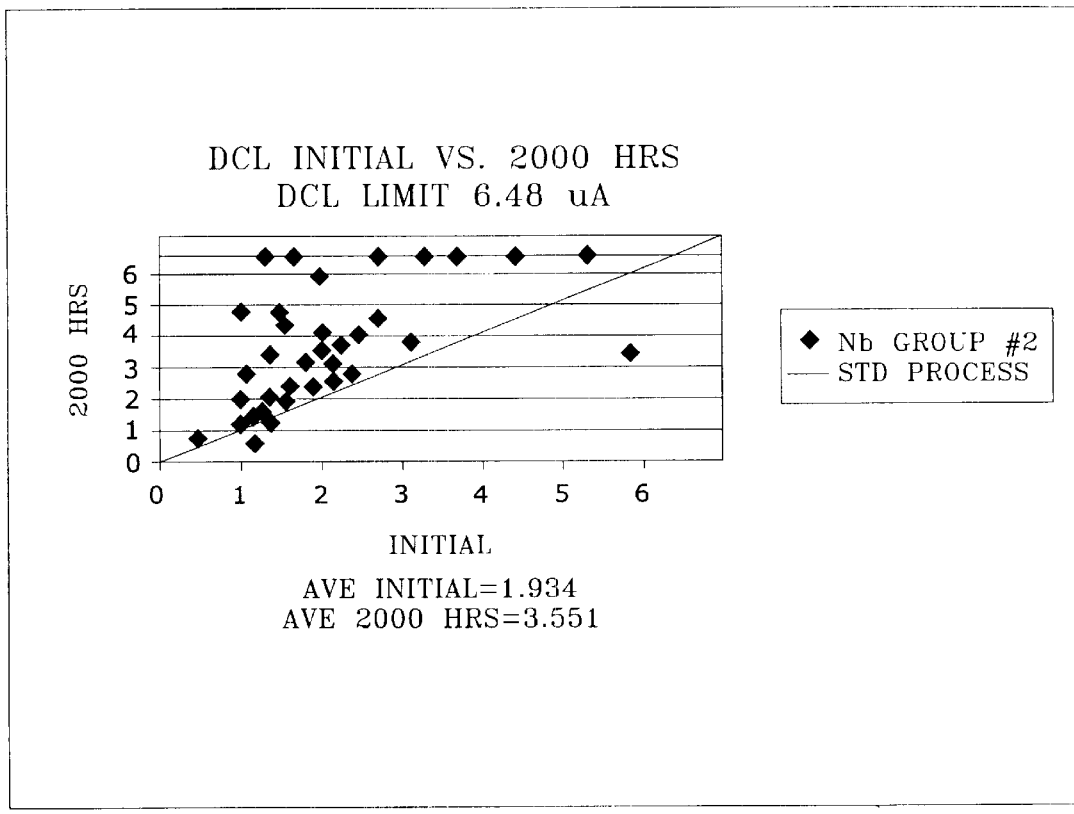

The experimental pellets manufactured according to the present invention provide the high reliability of the final parts, while parts with control pellets demonstrate unsatisfactory Life characteristics. Besides failures, there is significant difference in the behavior of the populations of the capacitors with experimental and control pellets during the Life test. FIGS. 1 and 2 show DCL distribution before versus after, respectively a 2000 h Life test for experimental (a) and control (b) pellets.

It is apparent from FIGS. 1 and 2 that the experimental pellets provide high DCL stability for all population of the capacitors (all dots locate near the diagonal—FIG. 1), while in the case of control pellets, DCL increased during Life test versus initial state (most of the dots shift up—FIG. 2). Besides, yield is also better for the experimental pellets. Particularly, this is due to flexible lead wire with strong attachment to the pellet that prevents rejects due to mechanical damage of the lead wire during capacitor manufacturing.

EXAMPLE 3

Welded-type Tantalum pellets were pressed from Tantalum powder with CV=30,000 uFV/g with out lead wires and sintered in vacuum at a temperature of approximately 1400 C by conventional method. A Tantalum lead wire was welded to each pellet after its initial sintering. The weight of Tantalum powder in each pellet is known. Four percent by weight of magnesium was mixed with the initially sintered Tantalum pellets with welded lead wires. After that the pellet lot was split into experimental and control groups.

Then, according to this invention, crucibles with experimental Tantalum pellets and magnesium were placed into the vacuum chamber and pumped down to a pressure of $1\times10-6$ Torr. After that, Argon was admitted into the vacuum chamber and the temperature was increased to about 1,000 C for 3 hours. This process provided deoxidization of the Tantalum pellets.

Next, the temperature in the vacuum chamber was increased to 1250 C and pellets were annealed at this temperature for 20 minutes. This annealing provided purification of the welding zone similar to that shown in the Example 1.

After the annealing, the temperature was reduced to 1150 C and pure Nitrogen gas was admitted to the vacuum chamber for 10 min at the flow rate about of 5000 cc/min. Finally the Tantalum pellets were cooled in vacuum to room temperature and air was gradually admitted to the vacuum chamber.

Table 4 shows the chemical composition of the sintered Ta powder, lead pull out strength, and Wet check results for both experimental and control pellets

TABLE 4

| Pellet Parameters | Experimental | Control |
| --- | --- | --- |
| Oxygen, ppm | 1760 | 2430 |
| Nitrogen, ppm | 7200 | 230 |
| Lead Pull out Test, kg | 4.6 | 4.3 |
| Wet Check at 70 V: | | |
| Capacitance, uFV/g | 27.8 | 28.3 |
| DCL, nA/uFV | 0.18 | 0.23 |
| Rejects from 10 pieces | 0 | 0 |
| Result | Passed | Passed |

Table 4 shows that the experimental pellets have low oxygen, are doped with nitrogen and have strong attachment of the lead wire to the pellet. Both experimental and control pellets passed Wet Check at 70 V and were used for manufacturing of Tantalum capacitors rated 33 uF/16 V. The final parts were subjected to accelerated Life test at 125 C and rated voltage (RV) as well as at 85 C and 1.25RV.

Table 5 shows yield and 2000 hours accelerated Lite test results for the Tantalum capacitors with experimental and control pellets:

TABLE 5

| Capacitor Parameters | Experimental | Control |
| --- | --- | --- |
| Yield, % | 93 | 92.4 |
| Life Test at 125 C, RV | | |
| Failures from 96 pc. | 1 Hi DCL | 6 Shorts |
| Result | Passed | Failed |
| Life Test at 85 C, 1.25R V | | |
| Failures from 96 pc. | 0 | 3 Hi DCL + 3 Shorts |
| Result | Passed | Failed |

The Tantalum capacitors with experimental pellets manufactured according to the present invention passed accelerated Life test, while the capacitors with control pellets failed. This example demonstrates that the present invention allows production of Tantalum capacitors with high reliability even at accelerated conditions including elevated temperatures and applied voltages.

It is therefore seen that this invention will achieve at least all of its stated objectives.

I claim:

1. A method of producing pellets for use in electrolytic capacitors, comprising, taking a powder selected from one of Tantalum and Niobium, mixing an oxygen active metal with the powder to create a powder mixture, embedding a lead wire into the powder mixture and, pressing the powder mixture into separate self-contained pellets, placing the pellets into an oxygen free chamber of a sealed container at room temperature, increasing the temperature in the chamber to a second temperature sufficiently higher than the room temperature to cause the oxygen active metal to react with oxygen in the pellets to remove oxygen from the pellets, then subjecting the pellets in the chamber to a third temperature higher than the second temperature to anneal the pellets;

then cooling the pellets to the temperature lower than the annealing temperature;

then injecting nitrogen into the chamber so that the nitrogen diffuses into the pellets to give the pellets a minimum DLC, then cooling the chamber to room temperature, and removing the pellets from the chamber.

2. The method of claim 1 wherein the oxygen active metal is magnesium.

3. The method of claim 1 wherein the oxygen free chamber is created by a vacuum.

4. The method of claim 1 wherein the pellets are annealed in an inert atmosphere.

5. The method of claim 1 wherein the powder is Tantalum.

6. The method of claim 1 wherein the powder is Niobium.

7. The method of claim 1 wherein the second temperature is approximately 900 C.

8. The method of claim 1 wherein the vacuum is at a pressure approximately of $1\times10-6$ Torr.

9. The method of claim 1 wherein the pellets are subjected to the injected nitrogen for a period of 1–10 hours.

10. The method of claim 1 wherein the pellets are subjected to the injected nitrogen for a period of 2–4 hours.

11. A method of producing pellets for use in electrolytic capacitors, comprising, taking a powder selected from one of Tantalum and Niobium, mixing an oxygen active metal with the powder to create a powder mixture, pressing the powder mixture into separate self-contained pellets, welding a lead wire onto each of the pellets, placing the pellets into an oxygen free chamber of a sealed container at room temperature, increasing the temperature in the chamber to a second temperature sufficiently higher than the room temperature to cause the oxygen active metal to react with oxygen in the pellets to remove oxygen from the pellets, then subjecting the pellets in the chamber to a third temperature higher than the second temperature to anneal the pellets;

then cooling the pellets to the temperature lower than the annealing temperature;

then injecting nitrogen into the chamber so that the nitrogen diffuses into the pellets to give the pellets a minimum DLC, then cooling the chamber to room temperature, and removing the pellets from the chamber.

12. The method of claim 11 wherein the oxygen active metal is magnesium.

13. The method of claim 11 wherein the powder is Tantalum.

14. The method of claim 11 wherein the powder is Niobium.

15. The method of claim 11 wherein the oxygen free chamber is created by a vacuum.

16. The method of claim 11 wherein the pellets are annealed in an inert atmosphere.

17. The method of claim 11 wherein the second temperature is approximately 900 C.

18. The method of claim 11 wherein the pellets are subjected to the injected nitrogen for a period of 1–10 hours.

19. The method of claim 11 wherein the pellets are subjected to the injected nitrogen for a period of 2–4 hours.

20. A method of producing pellets for use in electrolytic capacitors, comprising, taking a powder selected from one of Tantalum and Niobium, pressing the powder into a self-contained pellets, placing the pellets into an oxygen-free atmosphere, removing any oxygen in the pellets while in an oxygen free atmosphere, annealing the pellets while in an oxygen free atmosphere, subjecting the pellets to nitrogen gas while in an oxygen free atmosphere so that the nitrogen diffuses into the pellet to reduce DLC.

21. A pellet for use in electrolytic capacitors produced from the following method steps:

taking a powder selected from one of Tantalum and Niobium, mixing an oxygen active metal with the powder to create a powder mixture, embedding a lead wire into the powder mixture and, pressing the powder mixture into separate self-contained pellets, placing the pellets into an oxygen free chamber of a sealed container at room temperature, increasing the temperature in the chamber to a second temperature sufficiently higher than the room temperature to cause the oxygen active metal to react with oxygen in the pellets to remove oxygen from the pellets, then subjecting the pellets in the chamber to a third temperature higher than the second temperature to anneal the pellets;

then cooling the pellets to the temperature lower than the annealing temperature;

then injecting nitrogen into the chamber so that the nitrogen diffuses into the pellets to give the pellets a minimum DLC, then cooling the chamber to room temperature, and removing the pellets from the chamber.

22. A pellet for use in electrolytic capacitors produced from the following method steps:

taking a powder selected from one of Tantalum and Niobium, mixing an oxygen active metal with the powder to create a powder mixture, pressing the powder mixture into separate self-contained pellets, welding a lead wire onto each of the pellets, placing the pellets into an oxygen free chamber of a sealed container at room temperature, increasing the temperature in the chamber to a second temperature sufficiently higher than the room temperature to cause the oxygen active metal to react with oxygen in the pellets to remove oxygen from the pellets, then subjecting the pellets in the chamber to a third temperature higher than the second temperature to anneal the pellets;

then cooling the pellets to the temperature lower than the annealing temperature;

then injecting nitrogen into the chamber so that the nitrogen diffuses into the pellets to give the pellets a minimum DLC, then cooling the chamber to room temperature, and removing the pellets from the chamber.

23. A pellet for use in electrolytic capacitors produced from the following method steps:

taking a powder selected from one of Tantalum and Niobium, pressing the powder into a self-contained pellets, placing the pellets into an oxygen-free atmosphere, removing any oxygen in the pellets while in an oxygen free atmosphere, annealing the pellets while in an oxygen free atmosphere, subjecting the pellets to nitrogen gas while in an oxygen free atmosphere so that the nitrogen diffuses into the pellet to reduce DLC.

24. The pellets of claim 21 wherein the pellet has a lead wire embedded therein.

25. The pellets of claim 21 wherein the pellet has a lead wire welded thereto.

26. The pellets of claim 21 wherein the pellet has a coating of a conductive polymer layer with a dielectric layer thereover.

27. The pellets of claim 26 wherein the polymer layer is manganese dioxide.

28. The pellets of claim 21 wherein the pellet is comprised of Tantalum.

29. The pellets of claim 21 wherein the pellet is comprised of Niobium.

30. The pellets of claim 21 wherein the lead wire is comprised of the same material as the powder.

31. The method of claim 1 wherein the lead wire is comprised of the same material as the powder.

32. The method of claim 11 wherein the pellet has a lead wire embedded therein.

* * * * *